United States Patent
Hämäläinen

(10) Patent No.: US 9,863,547 B2
(45) Date of Patent: Jan. 9, 2018

(54) VALVE OF A HYDRAULICALLY STRIKING DEVICE

(71) Applicant: Doofor Oy, Nokia (FI)

(72) Inventor: Jaakko Hämäläinen, Tampere (FI)

(73) Assignee: Doofor Oy, Nokia (FI)

(*) Notice: Subject to any disclaimer, the term of this patent is extended or adjusted under 35 U.S.C. 154(b) by 184 days.

(21) Appl. No.: 14/829,858

(22) Filed: Aug. 19, 2015

(65) Prior Publication Data
US 2016/0053908 A1    Feb. 25, 2016

(30) Foreign Application Priority Data
Aug. 19, 2014 (EP) ...................... 14181374

(51) Int. Cl.
| | | |
|---|---|---|
| *E21B 4/14* | (2006.01) | |
| *B25D 9/20* | (2006.01) | |
| *F16K 27/04* | (2006.01) | |
| *E21B 1/00* | (2006.01) | |
| *F16K 3/02* | (2006.01) | |
| *F16K 31/12* | (2006.01) | |

(52) U.S. Cl.
CPC .............. *F16K 27/04* (2013.01); *B25D 9/20* (2013.01); *E21B 1/00* (2013.01); *E21B 4/14* (2013.01); *F16K 3/029* (2013.01); *F16K 3/0254* (2013.01); *F16K 31/12* (2013.01)

(58) Field of Classification Search
CPC ........ F16K 27/04; F16K 3/0254; F16K 3/029; F16K 31/12; B25D 9/20; E21B 4/14; E21B 1/00
USPC .......................................... 173/169; 175/296
See application file for complete search history.

(56) References Cited

U.S. PATENT DOCUMENTS

| | | | |
|---|---|---|---|
| 4,172,411 A | | 10/1979 | Matsuda et al. |
| 5,014,796 A | * | 5/1991 | Gustafsson ............... E21B 4/14 |
| | | | 173/112 |
| 5,056,606 A | | 10/1991 | Barthomeuf |
| 5,277,264 A | | 1/1994 | Song et al. |
| 5,301,761 A | | 4/1994 | Fu et al. |

(Continued)

FOREIGN PATENT DOCUMENTS

| | | |
|---|---|---|
| CN | 1756888 A | 4/2006 |
| CN | 1836088 A | 9/2006 |

(Continued)

OTHER PUBLICATIONS

Extended European Search Report for European Patent Application No. 14181371.7 dated Jan. 30, 2015, 7 pages.

(Continued)

*Primary Examiner* — Marina Tietjen
(74) *Attorney, Agent, or Firm* — Alston & Bird LLP

(57) ABSTRACT

A valve of a hydraulically striking device having a housing, the housing having a moving member being seated inside the housing to move in a reciprocating manner by means of a hydraulic fluid. The moving member has an inner space, the housing has at least a first abutment surface abutting the moving member, the first abutment surface of the housing has a first surface located in a radial inner portion of the first abutment surface, wherein the first surface is arranged in fluid communication with the inner space, and a second surface located in a radial outer portion of the first abutment surface, wherein the second surface is arranged to form a sealing surface.

22 Claims, 3 Drawing Sheets

(56) References Cited

U.S. PATENT DOCUMENTS

| | | |
|---|---|---|
| 5,715,897 A | 2/1998 | Gustafsson |
| 6,135,216 A | 10/2000 | Lyon et al. |
| 6,799,641 B1 | 10/2004 | Lyon et al. |
| 7,681,664 B2 | 3/2010 | Patterson et al. |
| 2004/0188146 A1 | 9/2004 | Egerstrom |
| 2012/0006598 A1 | 1/2012 | Lyon et al. |

FOREIGN PATENT DOCUMENTS

| | | |
|---|---|---|
| CN | 102852455 A | 1/2013 |
| WO | WO 2013/028079 A1 | 2/2013 |

OTHER PUBLICATIONS

Extended European Search Report for European Patent Application No. 14181372.5 dated Feb. 3, 2015, 6 pages.
Extended European Search Report for European Patent Application No. 14181374.1 dated Feb. 3, 2015, 7 pages.
Catalog p. CP720-5, Directional Control Valves, DV-34, 11141719 (Rev AA) (Nov. 2013) 1 page.

\* cited by examiner

VALVE OF A HYDRAULICALLY STRIKING DEVICE

FIELD OF THE INVENTION

The present invention relates to a valve of a hydraulically striking device and its components, and a method of manufacturing the valve, where the hydraulically striking device may be used for striking on a material hydraulically for example in rock drilling or similar applications.

BACKGROUND OF THE INVENTION

There are various types of valves for hydraulically striking devices on the market. Similar for many of these hydraulically striking devices may be that there is a piston that hydraulically reciprocates between a first position and a second position and that movement is controlled hydraulically with a controlling arrangement which is in connection with the device, which controlling arrangement may be a valve for example inside the device. This valve comprises a moving member or a similar type of device that moves back and forth inside the housing of the valve. The moving member controls the fluid flow that is needed for moving the piston. The valve is operated by means of hydraulic pressure.

Hydraulically striking devices are used in the hydraulic machines that are, for example, working in rock drilling or similar applications. Rock drilling is usually performed in mines and construction plants. In some of the mining plants it is not uncommon that they can produce hundreds of thousands of tons of ore from the rock in a year. The hydraulically striking device is also used for drilling and sampling, general excavations, tunneling work and roof bolting. On the work site, the hydraulically striking device can be used for drilling of rock. One example of test results of one rock drilling equipment working on the drilling site shows typical operating values of the machine equipped with one model-size hydraulically striking device such as a penetration rate of around 2 meters/minute in granite with a drill hole diameter of around 50 mm when using a percussion pressure from around 100 bar up to 200-300 bar. On the drill site, around or over 100 mm holes are not uncommon for the rock drilling equipment.

Usually, a valve is provided inside the hydraulically striking device and is designed to last in the hard working environment of the machine. The valve is usually larger than a standard-size screw-in cartridge valve, robust and strongly built, as the hydraulically striking device can strike generally from 30 to 100 times in a second. The hydraulically striking device can weigh up to hundreds of kilos. But in the future, bigger and heavier models are needed when the demands from the industry rise. Also, demands for a higher striking force with lower flows raise the demands for the equipment so that the operating pressures of the hydraulically striking device can be at a higher-than-normal level.

But in many of these valves, a common problem is that a sticking effect is created in the moving member when pressure of the hydraulic fluid is conducted inside the valve. The surface that is towards the moving member is seldom even, which causes leakage and changes the pressure on that side. The pressure difference between opposite ends of the moving member creates an unwanted force acting towards the end that is at the lower pressure.

This unwanted force can create the mentioned sticking effect. The force can be diminished by diminishing the area of the sealing surface.

On the other side of the moving member, an opposite situation occurs. Pressure from the pressure line leaks inside the valve and creates a force opening the moving member, which creates more leakage. At first, this leakage is created because of the uneven surface of the sealing surface.

A common way to eliminate this sticking effect and leakage is to manufacture the end of the moving member substantially sharp. But this sharp edge is a problem in the hydraulically striking device because the moving member beats rapidly itself towards the housing of the valve, and this sharp edge does not last when the valve is used and in time will be worn off. This type of a sharp edge will create metal chips into the hydraulic fluid when it is used, and metal chips can create malfunction in a hydraulic system for example by jamming the movement of moving parts inside the device.

The objective of the invention is to eliminate or at least alleviate the problems mentioned above and introduce solutions for them.

SUMMARY OF THE INVENTION

According to a first aspect of the invention, there is provided a valve of a hydraulically striking device comprising a housing, the housing comprising a moving member being seated inside the housing to move in a reciprocating manner by means of a hydraulic fluid. The moving member comprises an inner space, the housing comprises at least a first abutment surface abutting the moving member, wherein the first abutment surface of the housing comprises a first surface located in a radial inner portion of the first abutment surface, wherein the first surface is arranged in fluid communication with the inner space, and a second surface located in a radial outer portion of the first abutment surface, wherein the second surface is arranged to form a sealing surface.

According to a second aspect of the invention, there is provided a valve of a hydraulically striking device comprising a housing, the housing comprising a moving member being seated inside the housing to move in a reciprocating manner by means of a hydraulic fluid. The moving member comprises an inner space, the housing comprises at least a first abutment surface abutting the moving member, wherein the first abutment surface of the housing comprises a first surface located in a radial inner portion of the first abutment surface, and a second surface located in a radial outer portion of the first abutment surface, wherein the second surface is arranged to form a sealing surface, and a groove between the first surface and the second surface being in fluid communication with the inner space via one or more radial grooves, which conduct the hydraulic fluid from the inner space through the first surface and to the groove.

According to a third aspect of the invention, there is provided a valve of a hydraulically striking device comprising a housing, the housing comprising a moving member being seated inside the housing to move in a reciprocating manner by means of a hydraulic fluid. The moving member comprises an inner space, the housing comprises a first abutment surface and a second abutment surface alternately abutting the moving member, wherein the first abutment surface and the second abutment surface of the housing comprise a first surface located in a radial inner portion of the first abutment surface and the second abutment surface, and a second surface located in a radial outer portion of the first abutment surface and the second abutment surface, wherein the second surface is arranged to form a sealing surface, and a groove between the first surface and the second surface being in fluid communication with the inner space via one or more radial grooves, which conduct the hydraulic fluid from the inner space through the first surface and to the groove.

In one embodiment of the invention, the housing of the valve is formed of at least two parts to provide for the assembling of the moving member inside the housing. In one embodiment of the invention, the housing further comprises a second abutment surface abutting the moving member, wherein the first abutment surface and the second abutment surface of the housing comprise a first surface located in a radial inner portion of the first abutment surface and the second abutment surface, wherein the first surface is arranged in fluid communication with the inner space, and a second surface located in a radial outer portion of the first abutment surface and the second abutment surface, wherein the second surface is arranged to form a sealing surface. In one embodiment of the invention, the moving member moves between the first abutment surface and the second abutment surface. In one embodiment of the invention, the first abutment surface and/or the second abutment surface comprises a groove into which pressure is conducted from the inner space. In one embodiment of the invention, the first abutment surface and/or the second abutment surface comprise(s) one or more radial grooves connected to the inner space and to the groove. In one embodiment of the invention, the groove is located between the first surface and the second surface. In one embodiment of the invention, the groove is arranged in fluid communication with the inner space by the one or more radial grooves from the inner space via the first surface. In one embodiment of the invention, the first abutment and the second abutment are flat surfaces.

In one embodiment of the invention, the first abutment surface and the second abutment surface are the same elements but the difference is that the second abutment surface is a mirror image of the first abutment surface. In one embodiment of the invention, the first abutment surface and the second abutment surface are alternately against the end of the moving member when the moving member is in its extreme position. In one embodiment of the invention, the moving member is placed between the first abutment surface and the second abutment surface. In one embodiment of the invention, the moving member moves approximately 4 mm in each direction. In one embodiment of the invention, the abutment surfaces are formed in parallel relative to the end of the moving member. In one embodiment of the invention, the abutment surfaces and the ends of the moving member are formed perpendicularly relative to the inner surface of the housing.

In one embodiment of the invention, the housing comprises a first end part and/or a second end part in which the groove is provided. In one embodiment of the invention, the groove is annular. In one embodiment of the invention, the groove is spiraling. In one embodiment of the invention, the groove is closer to the outer radial portion than to the inner radial portion. In one embodiment of the invention, the first abutment surface and the second abutment surface are the same. In one embodiment of the invention, one or more grooves are in fluid communication with the inner space, wherein the groove and the inner space are affected by the same pressure, or at least the pressure in the groove and in the inner space is at a substantially same level.

In one embodiment of the invention, the housing and/or the moving member is annular. In one embodiment of the invention, the housing acts as a valve casing. In one embodiment of the invention, the housing and/or the moving member is/are (a) sleeve-like component(s).

In one embodiment of the invention, the first surface is provided substantially rough and the second surface substantially even. In one embodiment of the invention, the first surface is provided substantially rough to provide the conducting of the hydraulic fluid to the surface from the inner space.

In one embodiment of the invention, the moving member is a spool of the valve or a poppet of the valve or a combination of a spool and a poppet of the valve.

In one embodiment of the invention, the valve is a valve of a rock drilling machine. In one embodiment of the invention, the hydraulic fluid in the inner space is in fluid communication with the inner end of the piston of the hydraulically striking device. In one embodiment of the invention, the valve is placed in proximity to the inner end of the piston of the hydraulically striking device. In one embodiment of the invention, the inner end of the piston is in the inner space of the moving member. In one embodiment of the invention, the valve is placed concentrically with the piston of the hydraulically striking device.

According to a fourth aspect of the invention, there is provided a method for manufacturing the valve of a hydraulically striking device according to the first aspect of the invention. According to the method a groove of the first abutment surface is made into a separate end part of the housing.

In one embodiment of the manufacturing method of the invention, the groove is made so as to be annular or spiraling. In one embodiment of the manufacturing method of the invention, the groove is arranged into the first abutment surface by making a channel radially in relation to the housing that connects to the groove from the inner space via the first surface.

The valve of a hydraulically striking device described here has many significant advantages comparing to the prior art. Because the groove is closer to the outer radial portion of the abutment surfaces than to the inner radial portion of the abutment surfaces, it stops leakage better because there is less surface area left on the second surface. Because there is always some roughness in the surface on the ends of the moving member or in the part of the housing which the ends of the moving member are facing, there is a possibility of a risk of leakage. When the area is very small, this risk is reduced.

The groove is formed between the first surface and second surface and the pressure of the hydraulically striking device is conducted to the groove, and this detaches the moving member out of the abutment surface. Because the housing has the groove, there is no possibility or at least a very small possibility of sticking of the moving member against the abutment surface.

The abutment surfaces are constructed in parallel relative to the end of the moving member, and the area towards which the moving member acts is bigger than with a sharp-edged construction of the moving member; consequently, the moving member is not damaged during the operation. There are no or at least substantially few metal chips coming into the system from the abutment surfaces due to the wearing effect of the abutment surfaces, and this way the risk of jamming of the components of the hydraulically striking device is reduced.

The groove exists in the separate end part(s), so the making or for example machining of the groove is possible. If there was not a separate part for the abutment surfaces, it would not be possible to go inside the housing for example with a tool of a CNC-machine to manufacture the groove. Other arrangements for the location of the groove are also possible. The groove can be made also in the moving member, for example in the end(s) of the moving member.

The embodiments of the invention described herein may be used in any combination with each other. Several or at least two of the embodiments may be combined together to form a further embodiment of the invention. A method or a device to which the invention is related may comprise at least one of the embodiments of the invention described hereinbefore.

Any of the above embodiments or modifications can be applied singly or in combination to the respective aspects to which they refer, unless they are explicitly stated as excluding alternatives.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

FIGS. 1a to 1d and 2a and 2b illustrate a valve 6 of a hydraulically striking device comprising a housing 1000, the housing 1000 comprising a moving member 14 being seated inside the housing 1000 to move in a reciprocating manner by means of a hydraulic fluid. As it is illustrated in FIGS. 1 and 2, the moving member 14 comprises an inner space 30, the housing 1000 comprises at least a first abutment surface 5000 abutting the moving member 14, the first abutment surface 5000 of the housing 1000 comprises a first surface 9000 located in a radial inner portion 7000 of the first abutment surface 5000, wherein the first surface 9000 is arranged in fluid communication with the inner space 30, and a second surface 10000 located in a radial outer portion 8000 of the first abutment surface 5000, wherein the second surface 10000 is arranged to form a sealing surface.

Figure 1A:
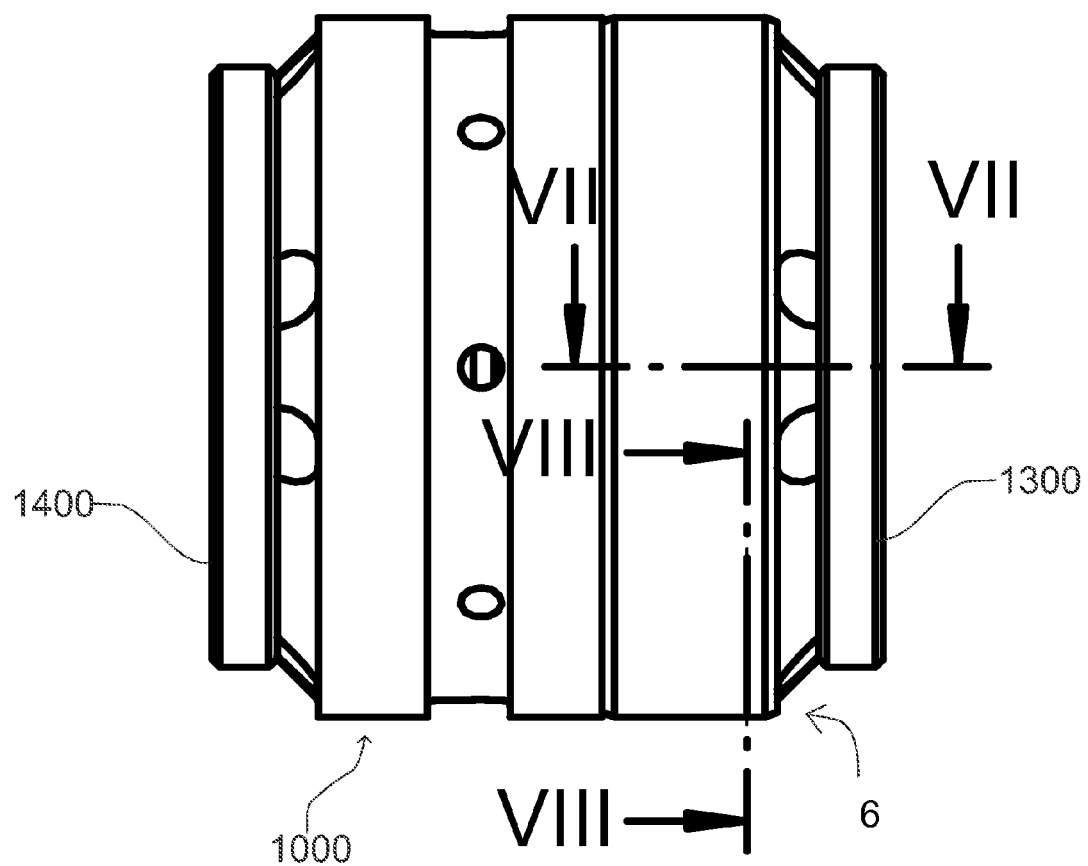
FIGS. 1a-1d are simplified illustrations of a valve of a hydraulically striking device.
Figure 1D:
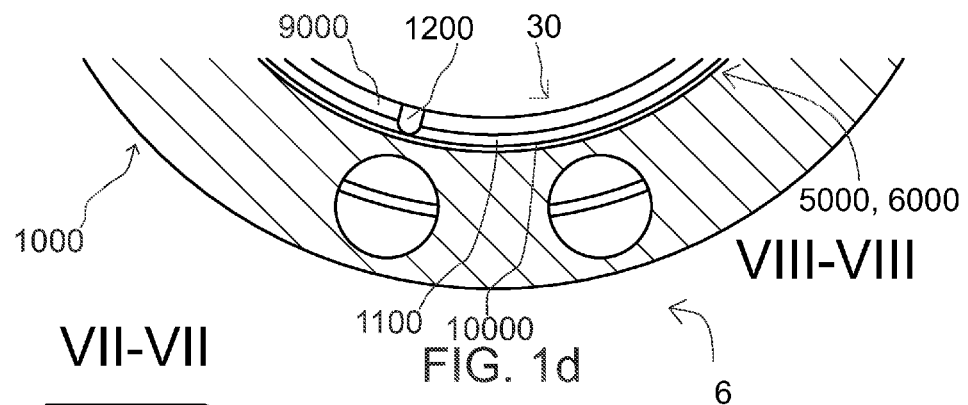
Figure 1B:
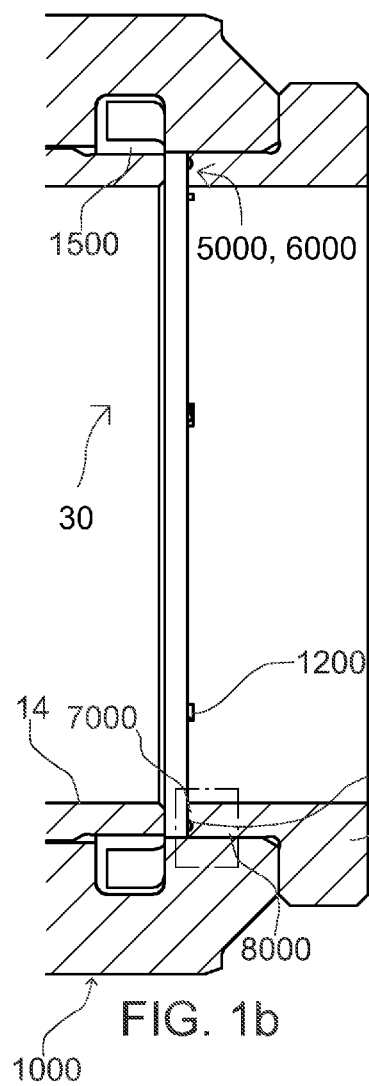
Figure 1C:
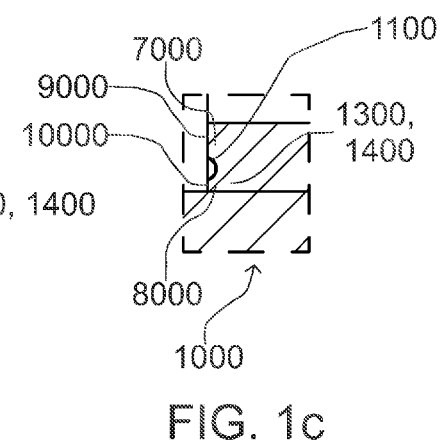

FIG. 1a illustrates the location of the different cross-sections of the valve 6. FIGS. 1b to 1d illustrate a cross-section of the valve 6. FIG. 1c is a detail from FIG. 1b where the area of the detail is marked with a dash-dot box.

The housing 1000 comprises a second abutment surface 6000 abutting the moving member 14, the first abutment surface 5000 and the second abutment surface 6000 of the housing 1000 comprise a first surface 9000 located in the radial inner portion 7000 of the first abutment surface 5000 and the second abutment surface 6000, wherein the first surface 9000 is arranged in fluid communication with the inner space 30, and a second surface 10000 located in a radial outer portion 8000 of the first abutment surface 5000 and the second abutment surface 6000, wherein the second surface 10000 is arranged to form a sealing surface. These are illustrated in FIGS. 1b and 1c. The moving member 14 moves between the first abutment surface 5000 and the second abutment surface 6000.

FIG. 1d illustrates that the first abutment surface 5000 and/or the second abutment surface 6000 comprises a groove 1100 into which pressure is conducted from the inner space 30. The first abutment surface 5000 and/or the second abutment surface 6000 comprises one or more radial grooves 1200 connected to the inner space 30 and to the groove 1100. The groove 1100 is located between the first surface 9000 and the second surface 10000. The groove 1100 is arranged in fluid communication with the inner space 30 by the one or more radial grooves 1200 from the inner space 30 via the first surface 9000. The groove 1100 between the first surface 9000 and the second surface 10000 is arranged in fluid communication with the inner space 30 via one or more radial grooves 1200, which conduct the hydraulic fluid from the inner space 30 through the first surface 9000 and to the groove 1100. The first abutment surface 5000 and the second abutment surface 6000 are flat surfaces.

The first abutment surface 5000 and the second abutment surface 6000 are the same elements, but the difference is that the second abutment surface 6000 is a mirror image of the first abutment surface 5000 relative to the middle vertical axis of the housing 1000 and is placed in the housing 1000 towards the opposite end of the moving member 14 when the moving member 14 is in its extreme position. The first abutment surface 5000 and the second abutment surface 6000 are alternately against the end of the moving member 14 when the moving member 14 is in its extreme position. The moving member 14 is placed between the first abutment surface 5000 and the second abutment surface 6000, wherein the moving member 14 moves in a reciprocating manner. The moving member 14 moves approximately 4 mm in each direction. First, the moving member 14 moves a little bit, for example 2 mm, towards the abutment surface 5000, 6000 to a point where it blocks a space 1500 in the housing 1000 substantially near the end of the moving member 14, and continues moving until finally sealing itself to the abutment surface 5000, 6000. The space 1500 can be either a pressure space or a return space of the valve 6.

The abutment surfaces 5000, 6000 can be manufactured in different ways. The abutment surfaces 5000, 6000 are formed in parallel relative to the end of the moving member 14. In FIGS. 1 and 2, the abutment surfaces 5000, 6000 and the ends of the moving member 14 are formed perpendicularly relative to the inner surface of the housing 1000. However, they can be optionally formed also in an angled fashion, if the desired mechanism of the co-operation with the abutment surfaces 5000, 6000 and the moving member 14 that was described earlier is accomplished.

The housing 1000 comprises a first end part 1300 and/or a second end part 1400 in which the groove 1100 is provided. FIGS. 1 and 2 show that the groove 1100 is annular. But optionally, the groove 1100 can be formed so as to be spiraling into the abutment surfaces 5000, 6000. In FIGS. 1 and 2, the groove 1100 is closer to the outer radial portion 8000 than to the inner radial portion 7000. This means that it stops leakage better, because there is less surface area left on the second surface 10000 of the abutment surface 5000, 6000.

The first abutment surface 5000 and the second abutment surface 6000 are mirror images of each other and comprise the same structures as described above, i.e. the groove 1100, the outer radial portion 8000, the inner radial portion 7000, the first surface 9000 and the second surface 10000. The groove 1100 is arranged between the first surface 9000 and the second surface 10000. In the valve 6, the groove 1100 is in fluid communication with the inner space 30, wherein the groove 1100 and the inner space 30 are affected by the same pressure, or at least the pressure in the groove 1100 and in the inner space 30 is at a substantially same level, so as a result the first surface 9000 does not have a sealing effect. Because fluid is able to flow between the housing 1000 and the moving member 14 via the groove 1100, the pressure is able to act between the housing 1000 and the moving member 14 and detach the moving member 14 from the abutment surface 5000, 6000.

The housing 1000 and/or the moving member 14 is annular. The housing 1000 acts as a valve 6 casing. The housing 1000 and/or the moving member 14 is a sleeve-like component.

The first surface 9000 is provided substantially rough and the second surface 10000 substantially even. When the surface is rough, fluid is able to flow between the housing 1000 and the moving member 14, and this way pressure is able to act between the housing 1000 and the moving member 14 and detach the moving member 14. An even surface, on the contrary, does not have the mentioned effect and in this case forms a sealing surface.

Figure 2A:
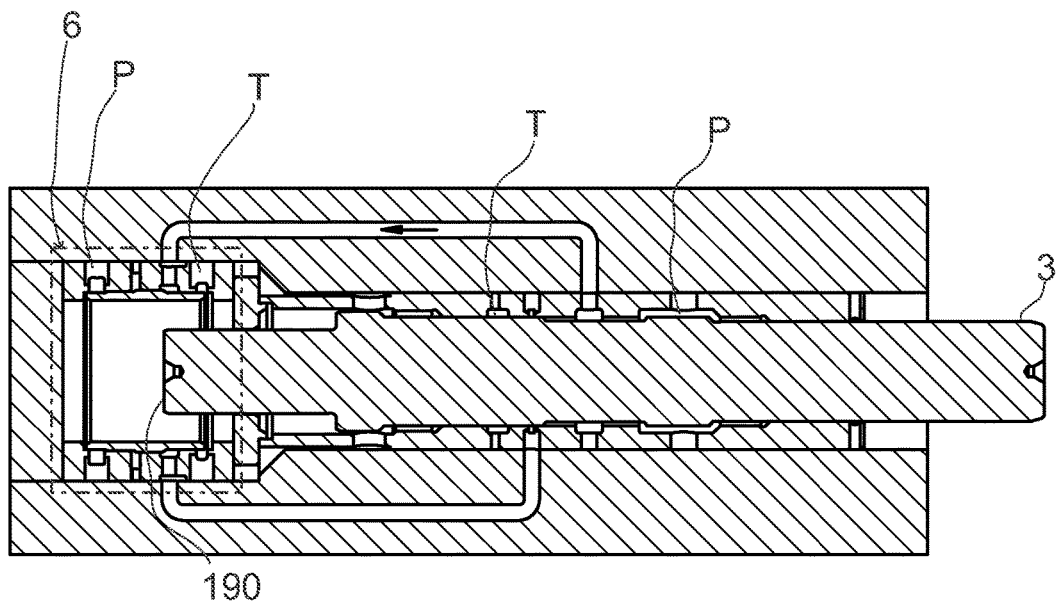
FIGS. 2a-2b are illustrations of a cross-section of a hydraulically striking device where the valve is marked with a dash-dot box.
Figure 2B:
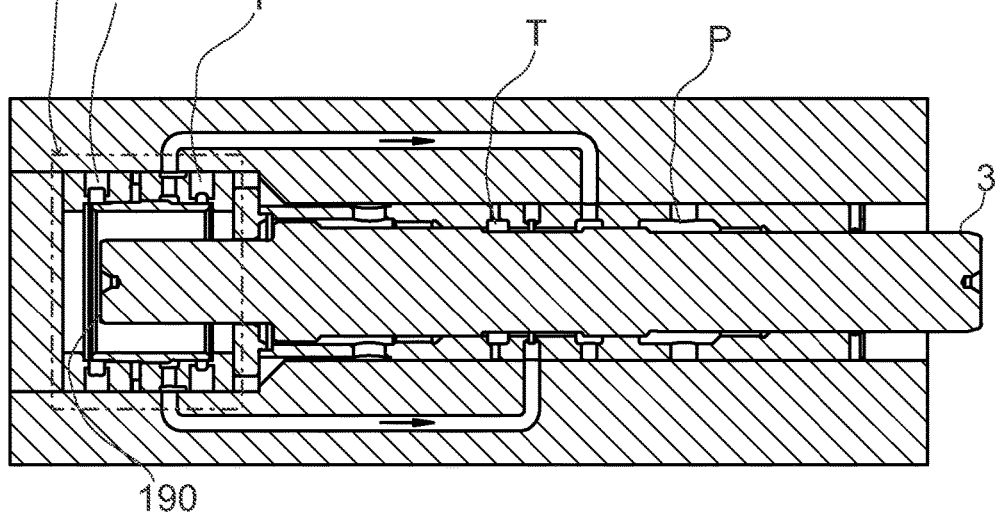

FIGS. 2a and 2b illustrate a cross-section of a hydraulically striking device, where FIG. 2a shows the first position of the piston 3 and FIG. 2b shows the second position of the piston 3, where the valve 6 is indicated inside a dash-dot box. In FIG. 2, the hydraulic fluid in the inner space 30 is in fluid communication with the inner end 190 of the piston 3 of the hydraulically striking device. In FIG. 2, the valve 6 is placed in proximity to the inner end 190 of the piston 3 of the hydraulically striking device. The inner end 190 of the piston 3 is in the inner space 30 of the moving member 14. The valve 6 is placed concentrically with the piston 3 of the hydraulically striking device. The moving member 14 blocks the flow communication and seals itself when the moving member 14 is towards the second surface 10000. The valve 6 may be used for example in a rock drilling machine. The valve 6 is needed in the device to supply the correct timing of the piston 3 in the work cycle of the piston 3.

A method is disclosed for manufacturing a valve 6 of a hydraulically striking device comprising a housing 1000, the housing 1000 comprising a moving member 14 being seated inside the housing 1000 to move in a reciprocating manner by means of a hydraulic fluid, the moving member 14 comprising an inner space 30, the housing 1000 comprising at least a first abutment surface 5000 abutting the moving member 14, the first abutment surface 5000 of the housing 1000 comprising a first surface 9000 located in a radial inner portion 7000 of the housing 1000, wherein the first surface 9000 is arranged in fluid communication with the inner space 30, and a second surface 10000 located in a radial outer portion 8000 of the housing 1000, wherein the second surface 10000 is arranged to form a sealing surface. A groove 1100 of the abutment surface 5000 is made into a separate end part 1300, 1400 of the housing 1000. The groove 1100 is made so as to be annular or spiraling. The fluid communication to the groove 1100 is arranged by making a radial groove 1200 from the inner space 30 via the first surface 9000. The housing 1000 must be manufactured from at least two parts so as to provide for the assembling and disassembling of the moving member 14 inside the housing 1000.

The moving member 14 can be implemented in different ways. The moving member 14 is a spool of the valve or a poppet of the valve or a combination of a spool and a poppet of the valve. In the examples of the invention, the moving member is the combination of a spool and a poppet of the valve 6, which reciprocates inside the housing 1000.

This invention is particularly useful in equipment wherein the valve 6 of a hydraulically striking device is used in hydraulic machines that are for example working in the rock drilling or similar applications.

It is understood that with the advancement of technology, the basic idea of the invention may be implemented in various ways. The invention and its embodiments are thus not limited to the examples described above, instead they may vary within the scope of the claims.

The embodiments of the invention described herein may be used in any combination with each other. Several or at least two of the embodiments may be combined together to form a further embodiment of the invention. A method or a device to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

What is claimed:

1. A valve of a hydraulically striking device comprising a housing comprising:
   a moving member being seated inside the housing to move in a reciprocating manner by means of a hydraulic fluid, wherein the moving member comprises an inner space,
   at least a first abutment surface positioned against the moving direction of the moving member, wherein the moving member is configured to abut the first abutment surface in an extreme position of the moving member,
   wherein the first abutment surface of the housing comprises:
      a first surface located in a radial inner portion of the first abutment surface, wherein the first surface is arranged in fluid communication with the inner space, and
      a second surface located in a radial outer portion of the first abutment surface, wherein the second surface is arranged to form a sealing surface.

2. The valve according to claim 1, wherein the housing further comprises
   a second abutment surface abutting the moving member, wherein the first abutment surface and the second abutment surface of the housing comprise
      a first surface located in the radial inner portion of the first abutment surface and the second abutment surface, wherein the first surface is arranged in fluid communication with the inner space, and
      a second surface located in a radial outer portion of the first abutment surface and the second abutment surface, wherein the second surface is arranged to form a sealing surface.

3. The valve according to claim 2, wherein the moving member moves between the first abutment surface and the second abutment surface.

4. The valve according to claim 1, wherein the first abutment surface and/or the second abutment surface comprises a groove into which pressure is conducted from the inner space.

5. The valve according to claim 4, wherein the first abutment surface and/or the second abutment surface comprises one or more radial grooves connected to the inner space and to the groove.

6. The valve according to claim 4, wherein the housing further comprises a first end part and/or a second end part in which the groove is provided.

7. The valve according to claim 4, wherein the groove is annular.

8. The valve according to claim 4, wherein the groove is spiraling.

9. The valve according to claim 4, wherein the groove is closer to the outer radial portion than to the inner radial portion of the housing.

10. The valve according to any claim 1, wherein the housing and/or the moving member is annular.

11. The valve according to claim 1, wherein the housing acts as a valve casing.

12. The valve according to claim 1, wherein the first surface is provided substantially rough and the second surface substantially even.

13. The valve according to claim 1, wherein the moving member is a spool of the valve or a poppet of the valve or a combination of a spool and a poppet of the valve.

14. The valve according to claim 1, wherein the valve is a valve of a rock drilling machine.

15. A method for manufacturing the valve of a hydraulically striking device according to claim 1, wherein the first abutment surface comprises a groove, and the first abutment surface is on a separate end piece of the housing.

16. The valve according to claim 2, wherein the first abutment surface and/or the second abutment surface comprises a groove into which pressure is conducted from the inner space.

17. The valve according to claim 3, wherein the first abutment surface and/or the second abutment surface comprises a groove into which pressure is conducted from the inner space.

18. The valve according to claim 5, wherein the housing further comprises a first end part and/or a second end part in which the groove is provided.

19. The valve according to claim 5, wherein the groove is annular.

20. The valve according to claim 6, wherein the groove is annular.

21. A valve of a hydraulically striking device comprising:
a housing comprising:
  a moving member being seated inside the housing to move in a reciprocating manner by means of a hydraulic fluid, wherein the moving member comprises an inner space,
  at least a first abutment surface abutting the moving member,
  wherein the first abutment surface of the housing comprises:
    a first surface located in a radial inner portion of the first abutment surface, wherein the first surface is arranged in fluid communication with the inner space, and
    a second surface located in a radial outer portion of the first abutment surface, wherein the second surface is arranged to form a sealing surface,
wherein the first abutment surface and/or the second abutment surface comprises a groove into which pressure is conducted from the inner space.

22. A valve of a hydraulically striking device comprising:
a housing comprising:
  a moving member being seated inside the housing to move in a reciprocating manner by means of a hydraulic fluid, wherein the moving member comprises an inner space,
  at least a first abutment surface abutting the moving member,
  wherein the first abutment surface of the housing comprises:
    a first surface located in a radial inner portion of the first abutment surface, wherein the first surface is arranged in fluid communication with the inner space, and
    a second surface located in a radial outer portion of the first abutment surface, wherein the second surface is arranged to form a sealing surface,
wherein the first surface is provided substantially rough and the second surface substantially even.

* * * * *